(12) United States Patent
Dakroub (10) Patent No.: US 6,650,493 B2
(45) Date of Patent: Nov. 18, 2003

(54) PULSED WRITE CURRENT ADAPTED FOR USE WITH A FIELD MAINTENANCE CURRENT IN A DATA STORAGE DEVICE

(75) Inventor: Housan Dakroub, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 292 days.

(21) Appl. No.: 09/795,404

(22) Filed: Feb. 28, 2001

(65) Prior Publication Data

US 2001/0033445 A1 Oct. 25, 2001

Related U.S. Application Data (60) Provisional application No. 60/193,674, filed on Mar. 31, 2000.

(51) Int. Cl.$^7$ .................................................. G11B 5/09
(52) U.S. Cl. ............................. 360/46; 360/45; 360/50
(58) Field of Search ........................... 360/40, 44, 45, 360/46, 48, 50, 51, 68, 119, 41, 31, 61

(56) References Cited

U.S. PATENT DOCUMENTS

| | | | |
|---|---|---|---|
| 4,233,525 A | 11/1980 | Takahashi et al. | |
| 4,625,245 A | * 11/1986 | White | 360/40 |
| 4,809,088 A | 2/1989 | Lofgren et al. | |
| 5,047,876 A | * 9/1991 | Genheimer et al. | 360/46 |
| 5,065,377 A | 11/1991 | Spruit et al. | |
| 5,267,096 A | 11/1993 | Buchan et al. | |
| 5,359,467 A | 10/1994 | Nakamura | |
| 5,386,328 A | * 1/1995 | Chiou et al. | 360/68 |
| 5,724,287 A | 3/1998 | Takenaka | |
| 6,055,117 A | 4/2000 | Hansen et al. | |
| 6,301,068 B1 | * 10/2001 | Ionescu | 360/68 |
| 6,466,386 B1 | * 10/2002 | Dakroub | 360/46 |
| 6,493,161 B1 | * 12/2002 | Elliott et al. | 360/46 |

* cited by examiner

Primary Examiner—David Hudspeth
Assistant Examiner—Natalia Figueroa
(74) Attorney, Agent, or Firm—Kirk A. Cesari (57) ABSTRACT

An apparatus and method for writing data to a magnetizable recording medium in the form of spaced-apart magnetic flux transitions forming magnetization vectors having alternating magnetic orientations and selected lengths. A write element adjacent the medium includes a leading edge and a trailing edge forming a write gap which, when the write element is activated by an electric current, provides a write field for selectively magnetizing the magnetizable medium. A write driver circuit is responsive to a data input stream in providing a write current activating the write element, the write current comprising a pulse current in a phased relationship with a continuous current.

10 Claims, 8 Drawing Sheets

PULSED WRITE CURRENT ADAPTED FOR USE WITH A FIELD MAINTENANCE CURRENT IN A DATA STORAGE DEVICE

CROSS REFERENCE TO RELATED APPLICATION

This application claims priority to U.S. Provisional Application Ser. No. 60/193,674 filed Mar. 31, 2000.

FIELD OF THE INVENTION

This invention relates generally to the field of magnetic or magneto-optic data storage devices, and more particularly but not by way of limitation, to improving data transfer rate performance by writing data with a magnetic field to a magnetizable medium using a write driver circuit providing a write current comprising a field reversing pulse current in phased relationship with a field maintenance continuous current.

BACKGROUND OF THE INVENTION

Disc drives are used as primary data storage devices in modern computer systems and networks. A typical disc drive comprises one or more rigid magnetizable storage discs which are rotated by a spindle motor at a high speed. An array of read/write heads transfer data between tracks of the discs and a host computer. The heads are mounted to an actuator assembly which is positioned so as to place a particular head adjacent the desired track.

Each of the discs is coated with a magnetizable medium wherein the data is retained as a series of magnetic domains of selected orientation. The data are imparted to the data disc by a write element of the corresponding head. The data thus stored to the disc are subsequently detected by a read element of the head. Although a variety of head constructions have been utilized historically, magneto-resistive (MR) heads are typically used in present generation disc drives. An MR head writer uses a thin-film inductive coil arranged about a ferromagnetic core having a write gap. As write currents are passed through the coil, a magnetic write field (sometimes referred to as the "write bubble") is established emanating magnetic flux lines from the core and fringing across the write gap. The flux lines extend into the magnetizable medium to establish magnetization vectors in selected directions, or polarities, along the track on the data disc. Magnetic flux transitions are established at boundaries between adjacent magnetization vectors of opposite polarities.

To write a computer file to disc, the disc drive receives the file from the host computer in the form of input data which are buffered by an interface circuit. A write channel encodes and serializes the data to generate a data input stream that can be represented as a square-wave type signal of various lengths between rising and falling signal transitions.

A write driver circuit uses the data input stream to generate a write current which is applied to the write head, creating the write bubble that writes the encoded data to the magnetizable medium of the selected disc. The write current both reverses the polarity of the write bubble, creating the magnetic flux transitions, and sustains a given polarity between successive magnetic flux transitions.

Conventional write drivers employ continuous write currents. Continuous current writing is well suited for the relatively steady-state conditions between successive magnetic flux transitions. It is relatively difficult, however, to impart the magnetic flux transitions with continuous current writing, particularly at higher data transfer rates. This is due to the transitory rise/fall characteristics (sometimes referred to as slew rate) associated with reversing the polarity of a continuous write current.

Some write drivers employ pulse write currents. Pulse current writing is well suited for imparting the magnetic flux transitions. By using the data input stream to trigger a series of very short duration, discrete pulse currents, flux transitions with a relatively better edge definition can be created. However, sustaining the write current with only a pulse write driver between successive magnetic flux transitions can be problematic, especially over relatively long bit cell lengths.

There exists a need for improvements in the art to enhance write driver performance at ever-increasing data transfer rates, so as to better draw on the benefits of both types of write drivers.

SUMMARY OF INVENTION

The present invention provides an apparatus and an associated method for improving data transfer rate performance by writing data with a magnetic field to a magnetizable medium using a write driver circuit providing a write current comprising a field reversing pulse current in phased relationship with a field maintenance continuous current.

In one aspect of the present invention a method is provided for magnetically recording data to a magnetizable medium as a sequence of magnetic flux transitions. The method comprises providing a write element responsive to a current for generating a write field magnetizing the magnetizable medium. The method further comprises moving the magnetizable medium relative to the write element. The method further comprises providing a write current adaptively responsive to a data stream input for activating the write element to magnetically orient a first area of the medium in a first direction, the write current comprising a pulse current in a phased relationship with a continuous current. The method further comprises reversing the write current in response to the data stream input to magnetically orient a second area of the medium in a second direction.

In reversing the write current, the method applies the reversed write current generally during a transition window such that a portion of the first area remains within the write field so that a portion of the first area is magnetically reoriented by the reversed write current, the remaining portion of the first area having retained the first magnetization and traversed beyond the write field comprising a magnetization vector of a desired data bit length. More particularly, the maximum time associated with the transition window disposes the second area contiguous with the first area with no unrecorded gap therebetween.

In another aspect of the present invention a disc drive storage device is provided adapted for receiving a data input stream from a host computer and writing the data to storage. The disc drive storage device comprises a rotatable disc having a magnetizable medium storing the data as sequential magnetization vectors in alternating magnetic orientation. The disc drive storage device further comprises a write element operably adjacent the disc generating a write field for selectively magnetizing the magnetizable medium. The disc drive storage device further comprises a write driver circuit adaptively responsive to the data input stream and imparting a write current to the write element to magnetically orient the magnetizable medium in writing the data input stream to the disc, the write driver circuit comprising: a first source responsive to the data input stream for imparting a continuous current to the write element; a second source responsive to the data input stream for imparting a pulse current to the write element; and a delay timer phasing the responses of the first and second sources.

The disc drive storage device write driver imparts a write current to magnetically orient a first area of the magnetizable medium in a first direction, and imparts a reversed write current to magnetically orient a second area of the magnetizable medium in a second direction, the reversed write current being imparted during the transition window.

These and other features and benefits will become apparent upon a review of the following figures and their accompanying detailed description.

BRIEF DESCRIPTION OF THE DRAWINGS

FIG. 10 is a diagrammatic representation of the write element of FIG. 7 illustrating a case where the write bubble has been discontinuous such that no subsequent magnetization occurs before the magnetized medium leaves the write bubble.

FIG. 11 is a diagrammatic representation of the write element of FIG. 10 at a subsequent time when the write bubble magnetizes the medium with a gap of unrecorded medium formed between the adjacent data bits.

FIG. 13 is a schematic representation of a write driver circuit constructed in accordance with the present invention.

DETAILED DESCRIPTION OF THE PREFERRED EMBODIMENTS

Figure 1:
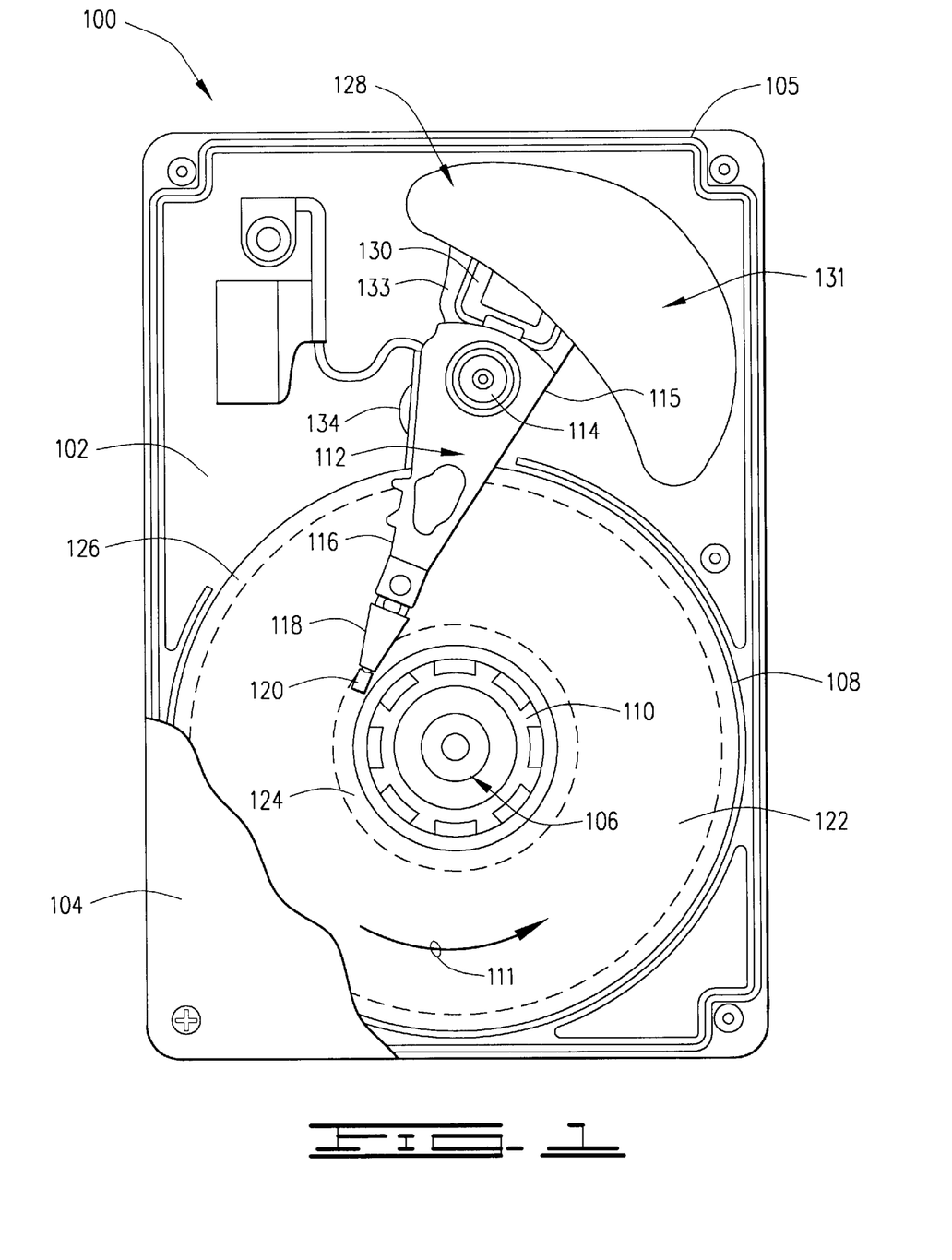
FIG. 1 is a plan view of a disc drive constructed in accordance with a preferred embodiment of the present invention.

Referring to the drawings in general, and more particularly to FIG. 1, shown therein is a plan representation of a disc drive 100 constructed in accordance with the present invention. The disc drive 100 includes a base deck 102 to which various disc drive components are mounted, and a cover 104 (partially cut-away) which together with the base deck 102 and a perimeter gasket 105 form an enclosure providing a sealed internal environment for the disc drive 100. Numerous details of construction are not included in the following description because they are well known to a skilled artisan and are unnecessary for an understanding of the present invention.

Mounted to the base deck 102 is a spindle motor 106 to which a plurality of discs 108 are stacked and secured by a clamp ring 110 for rotation at a high speed in direction 111. Adjacent discs are typically separated by a disc spacer (not shown). An actuator 112 pivots around a pivot bearing 114 in a plane parallel to the discs 108. The actuator 112 includes an actuator body 115 that is supported by the pivot bearing 114. The actuator body 115 has actuator arms 116 (only one shown) that support load arms 118 in travel across the discs 108 as the actuator arms 116 move within the spaces between adjacent discs 108. The load arms 118 are flex members that support data transfer members, such as read/write heads 120, with each of the read/write heads 120 adjacent a surface of one of the discs 108 and maintained in a data reading and writing spatial relationship by a slider (not shown) which operably supports the read/write head 120 on an air bearing sustained by air currents generated by the spinning discs 108.

Each of the discs 108 has a data storage region comprising a data recording surface 122 divided into concentric circular data tracks (not shown). Each of the read/write heads 120 is positioned adjacent a respective desired data track to read data from or write data to the data track. The data recording surface 122 can be bounded inwardly by a circular landing zone 124 where the read/write heads 120 can come to rest against the respective discs 108 at times when the discs 108 are not spinning. The data recording surface 122 can similarly be bounded outwardly by an overshoot cushion zone 126 beyond the outermost data track.

The actuator body 115 is pivotally positioned by a voice coil motor (VCM) 128 comprising an electrical coil 130 and a magnetic circuit source such as a magnet assembly 131. The magnet assembly 131 conventionally comprises one or more magnets supported by magnetic poles to complete the magnetic circuit. When controlled current is passed through the actuator coil 130, an electromagnetic field is set up which interacts with the magnetic circuit of the magnet assembly 131 to cause the actuator coil 130 to move. As the actuator coil 130 moves as supported by a yoke 133 portion of the actuator body 115, the actuator body 115 pivots around the pivot bearing 114, causing the read/write heads 120 to travel across the discs 108. A flex assembly facilitates electrical communication between the actuator assembly 112 and a disc drive printed circuit board, such as can be mounted to the underside of the base deck 102 (not shown). The flex assembly includes a write driver circuit 134 which electrically interfaces with the heads 120.

Figure 2:
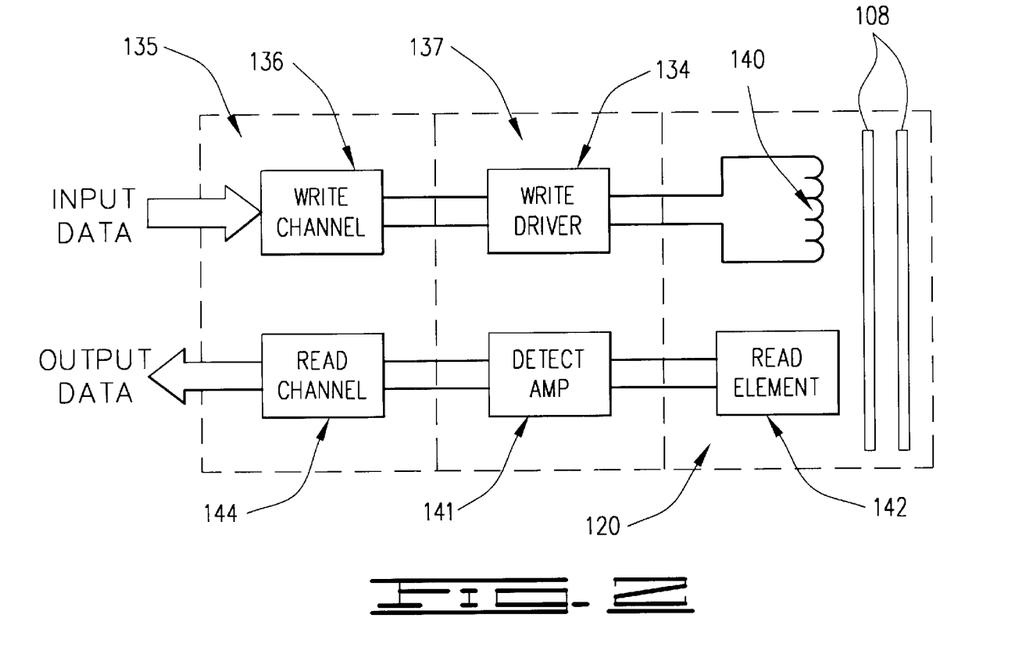
FIG. 2 is a diagrammatic representation of a portion of the disc drive of FIG. 1 showing the manner in which data are written to and read from the discs of the disc drive of FIG. 1.

FIG. 2 diagrammatically illustrates a portion of the disc drive of FIG. 1, particularly showing the manner in which data are transferred between a host computer and the discs 108. A data communication channel 135 includes a write channel 136 which encodes and serializes input data forming a data stream that is input to the write driver 134 of a preamplifier/driver circuit 137. As discussed below, the write driver circuit 134 applies a write current to a write element 140 of the selected head 120 to write the data stream to the respective disc 108. To read previously stored data, a detection amplifier 141 of the preamp 137 applies a bias current to an MR read element 142 and transduces the characteristic magnetization of the disc 108, forming a read back signal associated with changes in voltage across the read element 142. The detection amplifier 141 conditions the read back signal that is input to a read channel 144 of the data communication channel 135.

Figure 3:
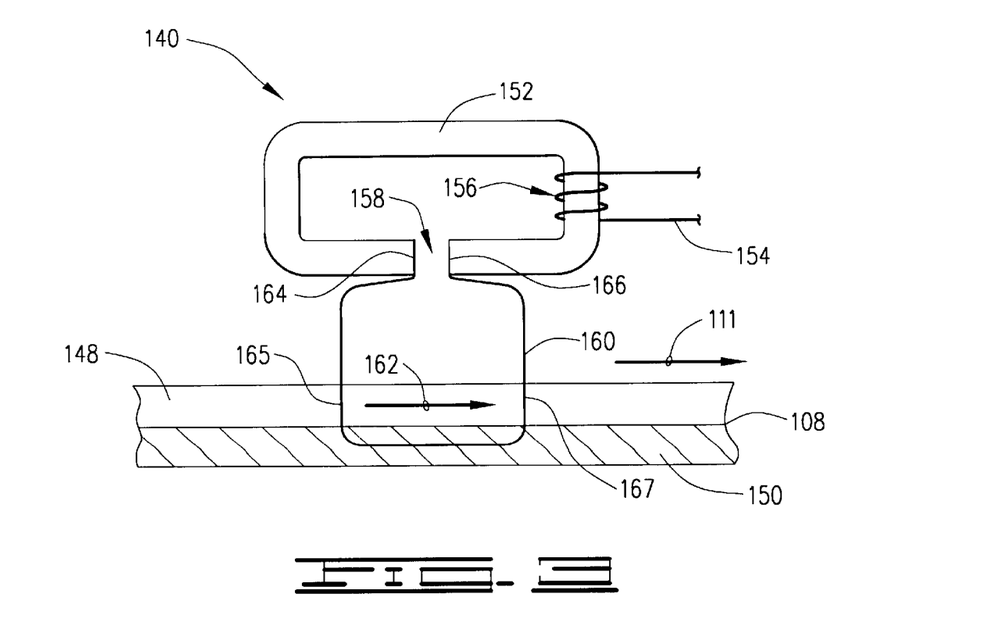
FIG. 3 is a diagrammatic representation of the write element shown in FIG. 2 operably adjacent a portion of the magnetizable medium on the corresponding disc of the disc drive, showing the write bubble formed by subjecting the write element to a write current.

FIG. 3 provides a diagrammatic representation of the write element 140 of FIG. 2 in conjunction with the respective disc 108. The disc 108 includes a magnetizable medium 148 coating on a substrate 150. Note that the magnetizable medium 148 is moving in the direction 111 in accordance with the operable disc 108 rotation. The magnetizable medium 148 magnetically stores the data as a series of magnetization vectors of a defined bit length, with orientations generally aligned in directions along the data tracks.

The write element 140 includes a ferromagnetic core 152 about which a conductor 154 is wound to form a coil 156. When a write current is passed through the conductor 154, magnetic flux lines are established in the core 152 that traverse a write gap 158, generating a write field 160 (or "write bubble" 160) of sufficient strength to magnetically orient the enveloped portion of the magnetizable medium 148.

Write currents in a first direction, for example, serve to magnetically orient the magnetizable medium 148 along the direction represented by magnetization vector 162. Write currents in an opposite direction thereby orient the magnetizable medium 148 in the direction opposite to magnetization vector 162. The core 152 has a leading edge 164 and a trailing edge 166, forming the write gap 158 therebetween. The write bubble 160 magnetizes medium 148 beyond the gap 158, as indicated by the leading and trailing edges 165, 167, respectively, of the write bubble 160.

Figure 4:
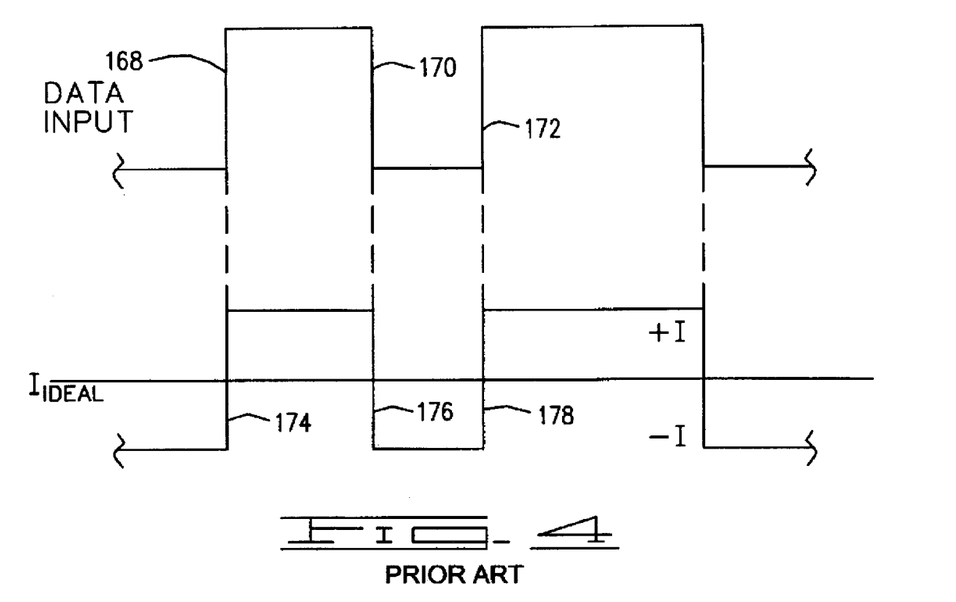
FIG. 4 is a graphical representation of the ideal response of an ideal write driver to the data input stream.

Thus, in the most general sense the write driver 134 (FIG. 2) is responsive to the data input stream in sending a write current to the write element 140 of the read/write head 120. FIG. 4 illustrates the ideal response, $I_{IDEAL}$, of an ideal write driver. Note that in the ideal case, for each data input stream cell boundary, such as 168, 170, 172, the write driver responsively forces an instantaneous current reversal 174, 176, 178. However, physical constraints of the components from which a write driver circuit is constructed preclude the possibility of such an ideally responsive write driver. For example, switches used for reversing write current direction are typically formed from transistors, which have inherent structural, or parasitic, capacitances preventing an instantaneous opening or closing in response to a control signal. Furthermore, conventional circuit switching arrangements comprise numerous switches operating cooperatively, thus compounding the difficulties that prevent attaining the ideal response.

Figure 5:
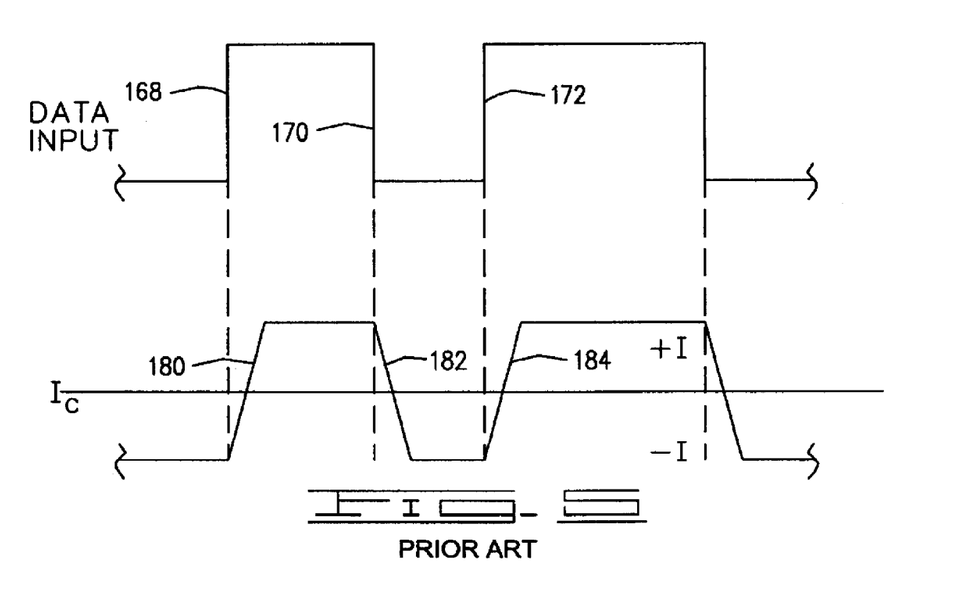
FIG. 5 is a graphical representation of a conventional continuous current write driver.

FIG. 5 illustrates a typical response of a conventional write driver employing a continuous write current, Ic. In comparison to the ideal case of FIG. 4, the continuous write current Ic is relatively slow to respond, as indicated by the characteristic transitory slew rate determining the current reversals 180, 182, 184 in response to the data cell boundaries 168, 170, 172. Although relatively easy and inexpensive to construct, the characteristic slow response limits the use of a continuous current write driver in high speed and high density data transfers.

Figure 6:
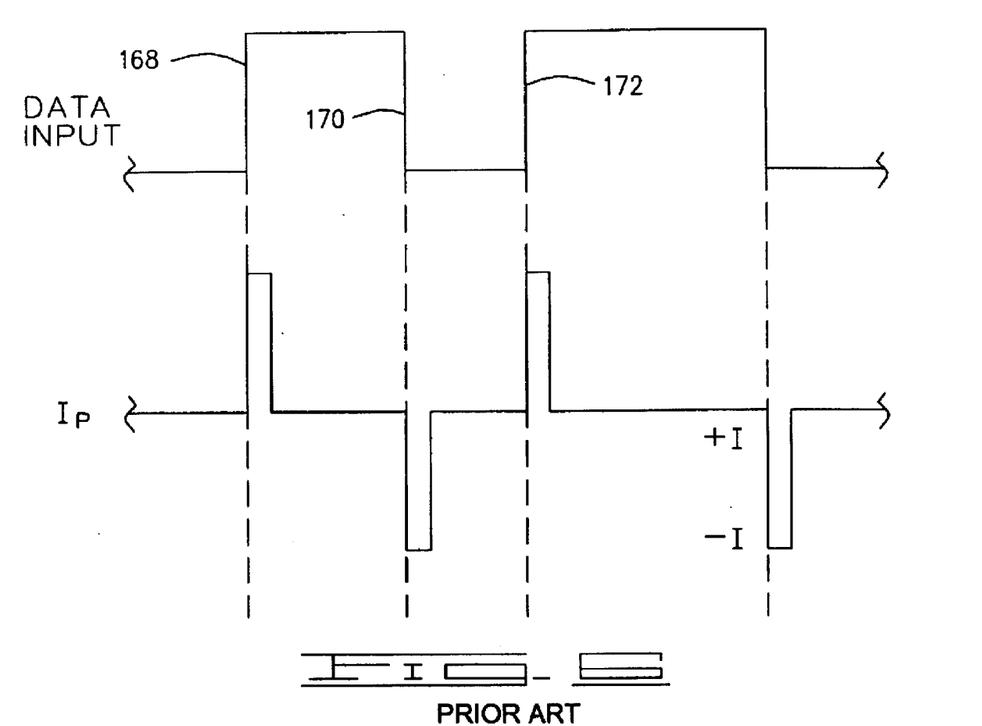
FIG. 6 is a graphical representation of a conventional pulse current write driver.

FIG. 6 illustrates an alternative approach wherein a write driver employing a pulse write current, $I_p$, is used in a "stamp and trim" method of data writing. Although the pulse write current $I_p$ offers a fast response and a superior edge form to the current reversals, where (as in FIG. 6) the bit length is greater than the pulse width, then the pulse write current $I_p$ is incapable of sustaining the write bubble 160 between adjacent magnetic flux transitions corresponding to the data cell boundaries 168,170,172.

Modifications to the continuous current write driver and/or to the pulse current write driver can improve their suitability for use individually or in combination in a write driver circuit. Such modifications, however, entail higher circuit complexity and cost. The present invention provides a write driver employing a simple and inexpensive continuous write current circuit in a novel phased relationship with a simple and inexpensive pulse write current circuit, providing an effective and efficient dual stage write driver 134.

One aspect of the present invention lies in the advantageous solution of a well-known problem associated with the unpredictability of reversing a continuous current. As noted before, switches used to reverse the write current have inherent characteristics preventing ideal opening and closing performance. Many attempts have been made to adequately sequence and/or compensate for the simultaneous opening and closing of pairs of switches such as are used in a common H-bridge arrangement. In such an arrangement, when one switch opens or closes before the complementary switch, the write current is momentarily discontinued due to the open circuit. This condition momentarily deactivates the write bubble 160.

Figure 7:
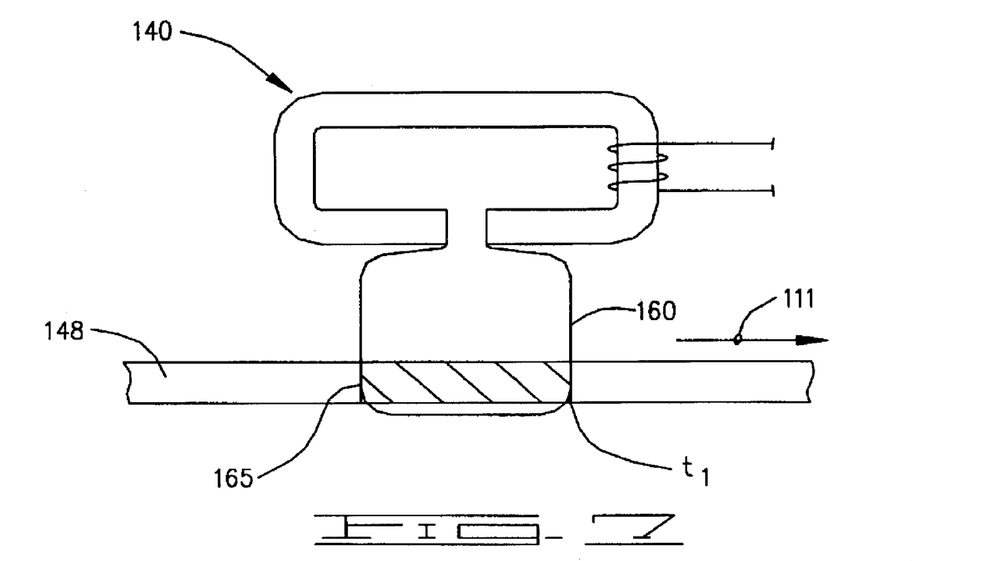
FIG. 7 is a diagrammatic representation similar to FIG. 3 of the write element with the write bubble activated at time (t1).
Figure 8:
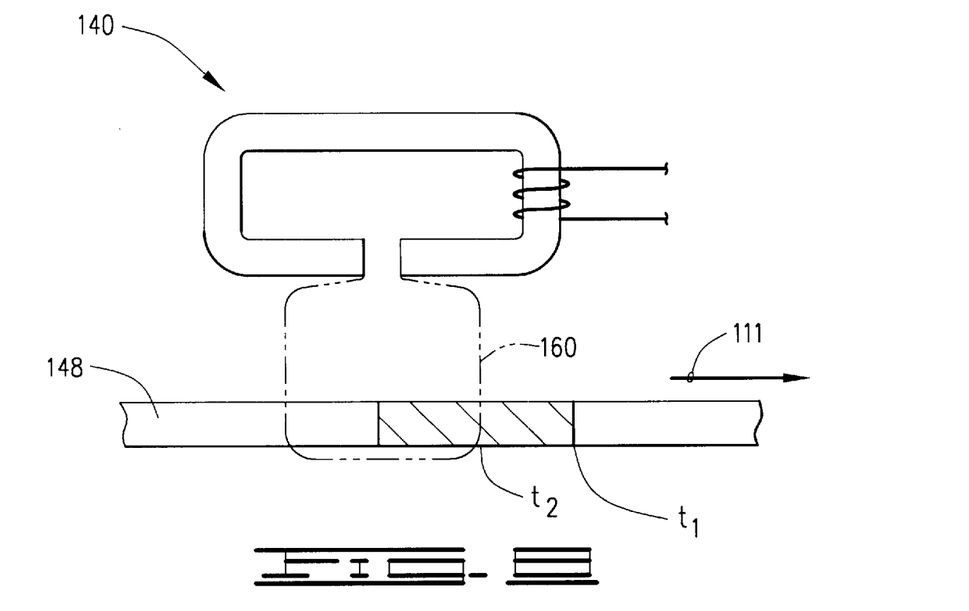
FIG. 8 is a diagrammatic representation of the write element of FIG. 7 at a subsequent time ($t_2$) when the write bubble is momentarily discontinuous.

FIG. 7 is a view similar to FIG. 3, illustrating the medium 148 in the write bubble 160 being instantaneously magnetized. The trailing edge of the write bubble 160 at this instantaneous time is denoted ($t_1$). If the write bubble 160 is momentarily deactivated at a time immediately subsequent to time ($t_1$), the medium 148 will nevertheless retain its prior magnetization from time ($t_1$). FIG. 8 illustrates the read/write head 140 at a subsequent time ($t_2$) (former location of the now deactivated write bubble 160 shown as phantom line). The former location of the write bubble trailing edge 167 is denoted ($t_2$).

Figure 9:
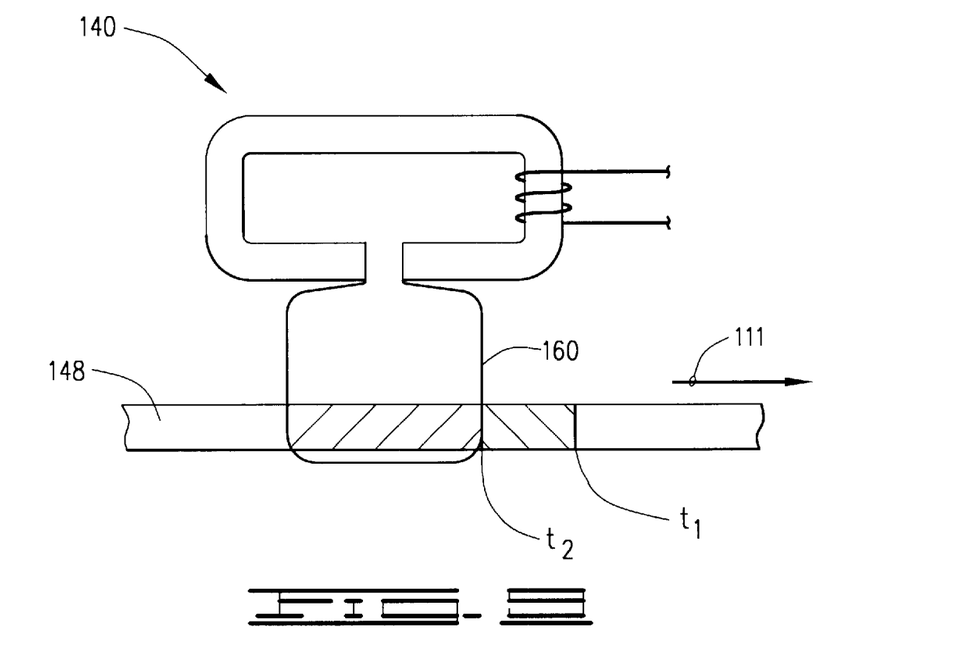
FIG. 9 is a diagrammatic representation of the write element of FIG. 8 illustrating the stamp and trim method of pulse writing.

Thus, there is an interval of opportunity after time ($t_1$) during which the write current can be noncontinuous and still avoid unrecorded medium 148. Namely, the write current must be reactivated before the magnetized medium 148 from ($t_1$) reaches the trailing edge of the write bubble 160. For example, FIG. 9 illustrates the write current being reactivated instantaneously at time ($t_2$). In this case, the newly magnetized medium overlaps a portion of the previously magnetized medium 148 at time ($t_1$). This is analogous to the "stamp and trim" methodology generally associated with pulse current writing. It will be noted that the example of FIG. 9 illustrates a reactivated write current of opposite polarity, forming a magnetic flux transition at the boundary. Alternatively, the reactivated write current can be of the same polarity, for example, to extend the bit length longer than the write bubble 160.

If, however, as in FIG. 10 at time ($t_2$) the leading edge of the magnetized medium 148 from time ($t_1$) reaches the trailing edge of the write bubble 160, then subsequent magnetization will result in unrecorded medium 148 being formed between the first and second magnetized regions. For example, FIG. 11 illustrates the write current reactivating the write bubble 160 at time ($t_3$), magnetizing a portion of the medium 148 that does not overlap and is not contiguous with the previously magnetized medium 148 at time ($t_1$).

Therefore, the interval of opportunity, ($t_d$), or "transition window," is defined as that time that is less than or equal to ($t_2$-$t_1$). For a given ($t_1$), ($t_2$) is defined exactly as the time it takes the magnetized area from ($t_1$) to traverse the write bubble 160. During this transition window (t_d) the write current can be discontinuous, such as from circuit switching, and the write driver 134 can effectively reactivate the write bubble 160 and continue to write data without producing gaps of unrecorded medium 148 between adjacent data bits. As discussed previously, using a pulse write current to activate the write bubble 160 results in the fastest response and best data bit edge form. But using a continuous write current best sustains the write bubble 160 polarity between long current reversal times associated with long bit times. The present invention provides a write driver 134 making optimal use of both types of write currents, in a novel phased relationship therebetween.

The present invention thus negates the adverse transitory characteristics associated with reversing a continuous write current. These transitory characteristics, such as the slew rate delays and circuit switching discontinuities, are of no effect because the magnetizable medium 148 retains the prior magnetization until such time that the write current imparts the magnetic flux transition on a desired portion of the previously magnetized medium 148. In fact, the write driver current switching circuits can make use of any part or all of the transition window, (t_d), to perform the overall current switching processes. This permits the use of relatively simpler and less expensive switching circuitry in the high-speed write driver 134 of the present invention.

Figure 12:
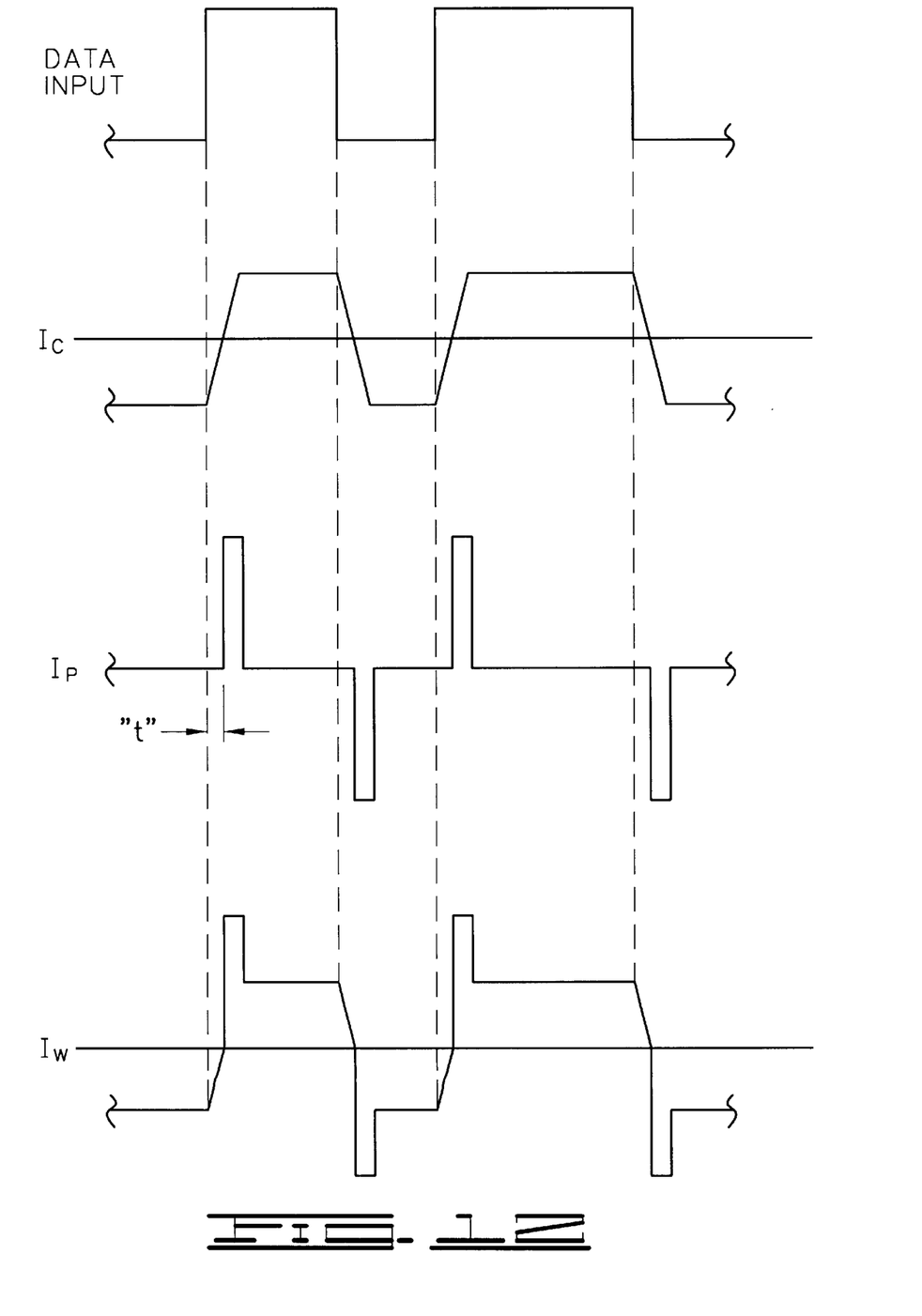
FIG. 12 is a graphical representation of the write current produced by a write driver constructed in accordance with the present invention, also illustrating the component continuous current and the pulse current that together form the write current.

FIG. 12 is a graphical representation of the write current $I_w$ produced by a write driver 134 (FIG. 2) constructed in accordance with the present invention. The write current $I_w$ is formed from the combination of a continuous write current $I_c$ with a pulse write current $I_p$. The write driver 134 reverses the continuous write current $I_c$ at the data cell boundary, and reverses the pulse write current $I_p$ at a selected time, illustrated by the interval denoted "t" in FIG. 12. Thus, the pulse current $I_p$ and the continuous current $I_c$ are preferably not reversed at the same time. More preferably, the pulse current $I_p$ is reversed when the continuous current, $I_c$, previously reversed, is nominally zero or thereafter within the transition window. In this manner the write current $I_w$ will reverse faster and with relatively less power dissipation in reversing from 0 amps to I (+/−) rather than from (+/−) I to (−/+) I. So long as (t) is within the transition window (t_d), as defined above, then the medium 148 will be continuously recorded without gaps between adjacent data bits.

This manner of a phased reversing of the continuous and pulse currents can be used to optimize the current switching capability of the write element 140. That is, the write element 140 is characterized by a current switching capability that is directly related to the initial state of the continuous current at the time the pulse current is reversed. Thus, the write element 140 switching capability is optimal at or after the time that the continuous current $I_c$, previously reversed, is nominally zero, and within the transition window. Similarly, this phased reversing is applicable to the power dissipation of the write driver 134 and of the write element 140, which is likewise optimal when the pulse current $I_p$ is reversed at the time or after the time that the continuous current $I_c$, previously reversed, is nominally zero, and within the transition window. Furthermore, this phased reversing is applicable to the write driver 134 supply current, which is optimal when the continuous and pulse currents $I_c$, $I_p$ are not reversed simultaneously.

FIG. 13 is a schematic illustration of a write driver 134 constructed in accordance with the present invention. A source 224 is connected in parallel with a source 226 to receive the data input stream. The sources 224, 226 have differential outputs 228, 230 and 232, 234 that are electrically connected to combine respective output currents of each to produce the write current $I_w$.

The source 224 can comprise a conventional continuous write driver circuit to generate the continuous write current $I_c$ of FIG. 12. Such a slow-switching write driver circuit is relatively uncomplicated and inexpensive. Advantages of such a write driver circuit are, for example, that the interconnect transmission lines can be terminated without loss of headroom, since the peak reversing current is provided by the pulse current $I_p$ circuit. Also, as discussed above, relatively low power is consumed by the reversing of the continuous current $I_c$ slowly.

The current source 226 can similarly comprise a conventional pulse write driver circuit to generate the pulse write current $I_p$ of FIG. 12. For example, the current source 226 of FIG. 13 comprises a pulse generator 246. More generally, the pulse write current $I_p$ can be generated by a class of circuits that generate pulses only. Alternatively, pulse generator 246 can comprise a conventional pulse generator capable of generating a selectively variable pulse width. Advantages of such circuits are, for example, the fast response and turn-off times, full rail to rail operation permitting the use of saturated switches, and lower power requirements permitting the use of faster transistors. Note also that termination transistors 235 are necessary only on the slow-switching source 224, so that the maximum switching voltage is not limited in the fast-switching source 226.

Finally, a delay timer 248 provides a phased relationship between the reversing of the continuous write current $I_c$ of the current source 224 and the triggering of the pulse write current $I_p$ of the current source 226. So long as the time delay provided by the delay timer 248 is within the transition window (t_2−t_1), as defined above, the pulse current $I_p$ will magnetize the medium 148 to define the data bit edge before the previously recorded medium 148 leaves the write bubble 160, so that no unrecorded gaps are formed between adjacent data bits. Alternatively, the delay timer 248 can provide a selectively variable time delay.

Overall, the write driver 134 of the present invention, as illustrated in FIGS. 12–13, offers enhanced high speed data writing performance because, in part, current reversals are not dependent upon the transitory nature of the continuous write current I; because data bit edges are optimized by the steep transition characteristics of the pulse current write; and because the continuous current writer can sustain the write bubble 160 between magnetic flux transitions.

Because the write driver 134 relies only on the fast pulse $I_p$ to reactivate the write bubble 160 (in extending the bit or starting the next bit) it is of no concern what any instantaneous write current $I_w$ the write driver 134 provides during the previously recorded transition interval. Therefore, during the transition window (t_2−t_1) the write driver 134 can be optimized on the basis of effectively and efficiently switching transistors in preparation for the fast pulse $I_p$. That is, the present invention permits the use of simple switching arrangements that were heretofore incapable of writing at high data transfer rates.

Thus, the write driver 134 of the present invention employs a write current comprising a field reversing pulse current in a phased relationship with a field sustaining continuous current. It will be noted that the write current $I_w$ can be discontinuous without producing unrecorded gaps in the magnetizable medium 148. Particularly, the write current $I_w$ can be discontinuous for a time equal to or less than the transition window without producing unrecorded gaps in the magnetizable medium. This permits the use of the transition window to advantageously design novel fast-acting write driver circuits form conventional, relatively inexpensive and uncomplicated sources.

Alternatively characterized, a first embodiment of the present invention is a method for using a write element responsive to a write current for magnetically recording data to a magnetizable medium 148 as a sequence of magnetic flux transitions. The method includes generating a write field with the write element while moving the magnetizable medium 148 through the write field. The write current is adapted responsive to a data stream input for activating the write element to magnetically orient a first area of the medium 148 in a first direction, the write current comprising a pulse current in a predetermined phase relationship with a continuous current, and reversing the write current in response to the data stream input to magnetically orient a second area of the medium 148 in a second direction opposed to the first direction. Preferably, the reversals 174,180 of the pulse current and of the continuous current have a non-zero phase offset.

In a second embodiment, the foregoing method is modified so that the reversed write current is applied during a transition window comprising a time such that a portion of the first area remains within the write field so that a portion of the first area is magnetically reoriented by the reversed write current, the remaining portion of the first area having retained the first magnetization and traversed beyond the write field comprising a magnetization vector 162 of a desired data bit length.

In a third embodiment, the foregoing method is modified so that a time equal to or less than the transition window is used to perform one or more circuit switching processes in order to reverse the write current. Preferably, the pulse current is reversed at a time when the continuous current, previously reversed, is about zero (i.e. has a negligible magnitude). Optionally, the write element is characterized by a current switching capability directly proportional to the initial state of the continuous current at the time the pulse current is reversed and such that the write element switching capability is optimal after the continuous current is nominally zero.

In a fourth embodiment, the foregoing method is performed so that almost no unrecorded gaps are formed in the magnetizable medium 148 despite substantial discontinuities in the write current (i.e. up to about the duration of the transition window).

In a fifth embodiment, the present invention is a data storage device (e.g. a magnetic tape drive or magneto-optic disc drive 100) adapted for receiving a data input stream from a host computer and storing the data. The device includes a magnetizable medium 148 storing the data as sequential magnetization vectors 162 in alternating magnetic orientation and a write element operably adjacent the medium 148 generating a write field for selectively magnetizing the it. The device also includes a write driver circuit 134 adaptively responsive to the data input stream and imparting a write current to the write element to magnetically orient the medium 148. The circuit includes a first source 224 responsive to the data input stream for imparting a continuous current to the write element, a second source 226 responsive to the data input stream for imparting a pulse current to the write element, and a delay timer 248 establishing a predetermined phase relationship in the responses of the first and second sources 224,226.

In a sixth embodiment, the foregoing device is modified so that the write driver 134 imparts a write current to magnetically orient a first area of the magnetizable medium 148 in a first direction, and wherein the write driver 134 imparts a reversed write current to magnetically orient a second area of the magnetizable medium 148 in a second direction. The reversed write current is imparted during a transition window comprising a time such that a portion of the first area remains within the write field so that a portion of the first area is magnetically reoriented by the reversed write current, the remaining portion of the first area having retained the first magnetization and traversed beyond the write field comprising a magnetization vector 162 of a desired length. The delay timer 248 provides a phased response time that is less than or equal to the transition window. The delay timer 248 can optionally be selectively variable and/or can phase the responses such that the pulse current is reversed at a time when the continuous current, previously reversed, has a negligible magnitude.

In a seventh embodiment, the foregoing device is modified so that the write driver 134 utilizes the transition window to electrically switch the circuit to reverse the write current. The write driver 134 is optionally characterized by a power dissipation that is directly related to the initial state of the continuous current such that the write driver 134 power dissipation is optimal when the pulse current is reversed at the time or after the time that the continuous current, previously reversed, is about zero.

In an eighth embodiment, the foregoing fifth embodiment is instead modified so that the continuous electrical continuity between the pulse current and the write element permits full rail-to-rail voltage pulses to the write element. Most preferably, the pulse width of the pulse current and the magnitudes of the continuous and pulse currents are all independently selectively variable. Also, the write driver 134 supply current is directly related to the phased reversing of the continuous and pulse currents, such that the write driver 134 supply current is optimal when the continuous and pulse currents are not reversed simultaneously.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for using a data storage device including a write element responsive to a write current for magnetically recording data to a magnetizable medium in the device as a sequence of magnetic flux transitions, the method comprising steps of:

(a) generating a write field with the write element;

(b) moving the magnetizable medium through the write field; and (c) adapting the write current responsive to a data stream input for activating the write element to magnetically orient a first area of the medium in a first direction, the write current comprising a pulse current in a predetermined phase relationship with a continuous current, and reversing the write current in response to the data stream input to magnetically orient a second area of the medium in a second direction, whereas the reversing of the write current is implemented such that a steady-state current does not occur during the reversal of the write current.

2. The method of claim 1 wherein the reversed write current of the adapting step (c) is applied during a transition window comprising a time such that a portion of the first area remains within the write field so that a portion of the first area is magnetically reoriented by the reversed write current, the remaining portion of the first area having retained the first magnetization and traversed beyond the write field comprising a magnetization vector of a predetermined data bit length.

3. The method of claim 1 wherein the pulse current and the continuous current are not reversed at the same time.

4. The method of claim 2 wherein a time equal to or less than the transition window is used to perform one or more circuit switching processes in order to reverse the write current.

5. The method of claim 2 wherein the pulse current is reversed at a time when the continuous current, previously reversed, is about zero.

6. The method of claim 4 wherein the write current can be discontinuous for a time equal to or less than the transition window without producing unrecorded gaps in the magnetizable medium.

7. A data handling device adapted for receiving a data input stream from a host computer and storing the data, comprising:
   a rotatable disc having a magnetizable medium storing the data as several sequential magnetization vectors in an alternating magnetic orientation;
   a write element operably adjacent the disc generating a write field for selectively magnetizing the magnetizable medium;
   a write driver circuit adaptively responsive to the data input stream and imparting a write current to the write element to magnetically orient the magnetizable medium in a magnetically oriented first direction when writing the data input stream to the disc, the write driver circuit comprising:
      a first source responsive to the data input stream for imparting a continuous current to the write element;
      a second source responsive to the data input stream for imparting a pulse current to the write element;
      a delay timer phasing the responses of the first and second sources;
   the write driver circuit being further configured to reverse the write current in response to the data input stream to impart a second area of the magnetizable medium in a magnetically oriented second direction, the write driver circuit configured such that a steady-state current does not occur during the reversal of the write current.

8. The data handling device of claim 7 wherein the delay timer phases the responses such that the pulse current is reversed at a time when the continuous current, previously reversed, is about zero.

9. The data handling device of claim 7 wherein the write driver utilizes the transition window to electrically switch the circuit to reverse the write current.

10. The data handling device of claim 7 wherein the continuous electrical continuity between the pulse current and the write element permits full rail-to-rail voltage pulses to the write element.

* * * * *